(12) United States Patent
Stern

(10) Patent No.: US 9,477,330 B2
(45) Date of Patent: Oct. 25, 2016

(54) STYLUS TILT TRACKING WITH A DIGITIZER

(71) Applicant: N-trig Ltd., Kfar-Saba (IL)

(72) Inventor: Yuval Stern, Even-Yehuda (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/533,328

(22) Filed: Nov. 5, 2014

(65) Prior Publication Data

US 2015/0123923 A1 May 7, 2015

Related U.S. Application Data

(60) Provisional application No. 61/899,933, filed on Nov. 5, 2013.

(51) Int. Cl.
*G06F 3/041* (2006.01)
*G06F 3/038* (2013.01)
*G06F 3/0354* (2013.01)
*G06F 3/046* (2006.01)

(52) U.S. Cl.
CPC ........... *G06F 3/038* (2013.01); *G06F 3/03545* (2013.01); *G06F 3/046* (2013.01); *G06F 3/0416* (2013.01); *G06F 3/0418* (2013.01)

(58) Field of Classification Search
CPC ...... G06F 3/038; G06F 3/046; G06F 3/0416; G06F 3/0418; G06F 3/03545
USPC ............ 345/156–184; 353/10, 20, 122, 451; 700/11, 17, 56, 83, 86
See application file for complete search history.

(56) References Cited

U.S. PATENT DOCUMENTS

| | | | | |
|---|---|---|---|---|
| 3,376,551 A * | 4/1968 | Armbruster | ................ | B41J 3/00 178/18.07 |
| 4,613,866 A * | 9/1986 | Blood | ..................... | G01B 7/004 324/207.13 |
| 5,117,071 A * | 5/1992 | Greanias | ............. | G06F 3/03545 345/174 |
| 5,121,333 A * | 6/1992 | Riley | ....................... | G06T 17/20 345/653 |
| 5,191,621 A * | 3/1993 | Brok | ....................... | H04N 5/217 348/E17.002 |
| 5,870,096 A * | 2/1999 | Anjyo | .................... | G06T 15/506 345/426 |
| 6,310,615 B1 * | 10/2001 | Davis | .................. | G06F 3/03545 178/18.01 |
| 6,427,079 B1 * | 7/2002 | Schneider | ................ | A61B 5/06 324/244 |
| 6,614,914 B1 * | 9/2003 | Rhoads | ............. | G06F 17/30876 382/100 |
| 7,411,581 B2 * | 8/2008 | Hardie-Bick | ......... | G06F 3/0433 178/18.01 |
| 8,994,918 B2 * | 3/2015 | Sogard | ....................... | G03F 1/84 355/52 |
| 9,201,568 B2 * | 12/2015 | Chavez | .................. | G06F 3/012 |
| 2003/0142067 A1 * | 7/2003 | Kurtenbach | ....... | G02B 27/2271 345/156 |

(Continued)

*Primary Examiner* — Prabodh M Dharia
(74) *Attorney, Agent, or Firm* — Qudus Olaniran; Sergey Lamansky; Micky Minhas

(57) ABSTRACT

A method for detecting orientation of a stylus with respect to a digitizer sensing surface includes detecting a signal emitted by a stylus at a plurality of coordinates on a digitizer sensing surface, determining coordinate of a writing tip of the stylus, defining at least one feature characterizing an asymmetrical spread of the stylus signal on the digitizer sensing surface with respect to the writing tip coordinate, and characterizing an orientation of the stylus responsive to the characterization of the asymmetrical spread.

18 Claims, 7 Drawing Sheets

(56) References Cited

U.S. PATENT DOCUMENTS

| | | | |
|---|---|---|---|
| 2003/0173121 A1* | 9/2003 | Zloter | G06F 3/03545 178/18.04 |
| 2004/0260507 A1* | 12/2004 | Chang | G06F 3/0346 702/152 |
| 2005/0083313 A1* | 4/2005 | Hardie-Bick | G06F 3/0433 345/177 |
| 2005/0134586 A1* | 6/2005 | Koo | G06T 17/20 345/423 |
| 2006/0138228 A1* | 6/2006 | Sanders | G06F 3/046 235/435 |
| 2006/0139338 A1* | 6/2006 | Robrecht | G06F 3/0488 345/175 |
| 2006/0140480 A1* | 6/2006 | Seto | G06K 9/222 382/187 |
| 2008/0238885 A1* | 10/2008 | Zachut | G06F 3/03545 345/174 |
| 2009/0123045 A1* | 5/2009 | Quadling | G06T 15/04 382/128 |
| 2009/0128516 A1* | 5/2009 | Rimon | G06F 3/0412 345/174 |
| 2009/0278798 A1* | 11/2009 | Kim | G06F 3/011 345/158 |
| 2010/0023149 A1* | 1/2010 | Sanders | A61F 2/5046 700/98 |
| 2010/0321338 A1* | 12/2010 | Ely | G06F 3/03545 345/174 |
| 2011/0043515 A1* | 2/2011 | Stathis | G01C 15/002 345/419 |
| 2011/0069041 A1* | 3/2011 | Cohen | G06F 3/002 345/180 |
| 2012/0050194 A1* | 3/2012 | Tanaka | G06F 3/0425 345/173 |
| 2012/0141949 A1* | 6/2012 | Bodony | A61C 9/0053 433/29 |
| 2012/0154296 A1* | 6/2012 | Hinckley | G06F 3/0416 345/173 |
| 2012/0188170 A1* | 7/2012 | Stedman | G06F 1/1626 345/173 |
| 2013/0088465 A1* | 4/2013 | Geller | G06F 3/03545 345/179 |
| 2013/0265258 A1* | 10/2013 | Garfinkel | G06F 3/0416 345/173 |
| 2013/0300696 A1* | 11/2013 | Haran | G06F 3/041 345/173 |
| 2014/0035859 A1* | 2/2014 | Wilson | G01R 27/26 345/174 |
| 2014/0168142 A1* | 6/2014 | Sasselli | G06F 3/0416 345/174 |
| 2014/0176495 A1* | 6/2014 | Vlasov | G06F 3/044 345/174 |
| 2014/0226896 A1* | 8/2014 | Imai | G06Q 50/10 382/154 |
| 2014/0267176 A1* | 9/2014 | Bathiche | G06F 3/0418 345/178 |
| 2014/0267186 A1* | 9/2014 | Kreek | G06F 3/03545 345/179 |
| 2014/0313159 A1* | 10/2014 | Wilson | G06F 3/044 345/174 |
| 2014/0347326 A1* | 11/2014 | Yim | G06F 3/03545 345/179 |
| 2015/0025845 A1* | 1/2015 | Mansfield | G01B 21/042 702/168 |
| 2015/0064679 A1* | 3/2015 | Ballestra | G09B 5/08 434/324 |
| 2015/0116366 A1* | 4/2015 | Daveney | G09B 5/08 345/659 |
| 2015/0277594 A1* | 10/2015 | Geaghan | G06F 3/044 345/179 |
| 2016/0054811 A1* | 2/2016 | Geller | G06F 3/03545 345/179 |

* cited by examiner

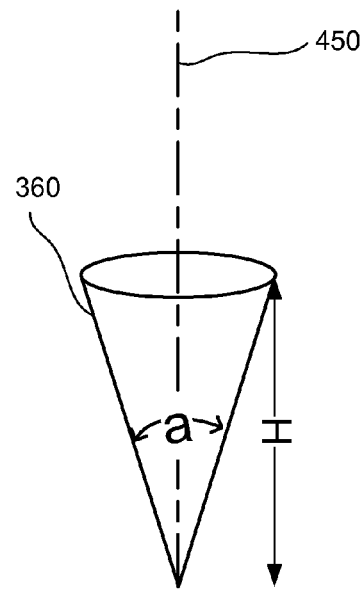
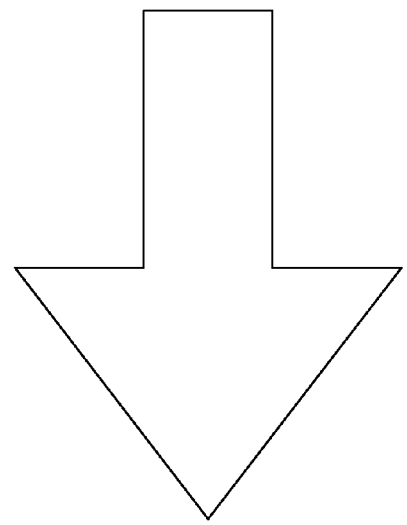
FIG. 3      FIG. 4A
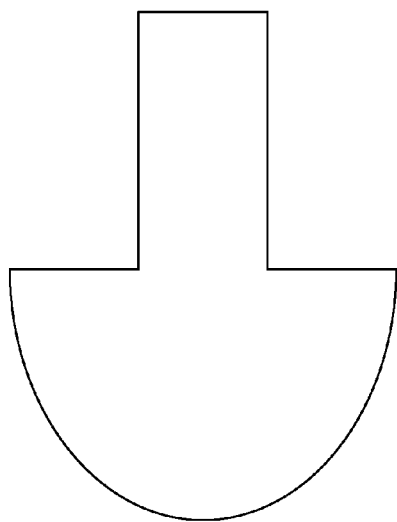
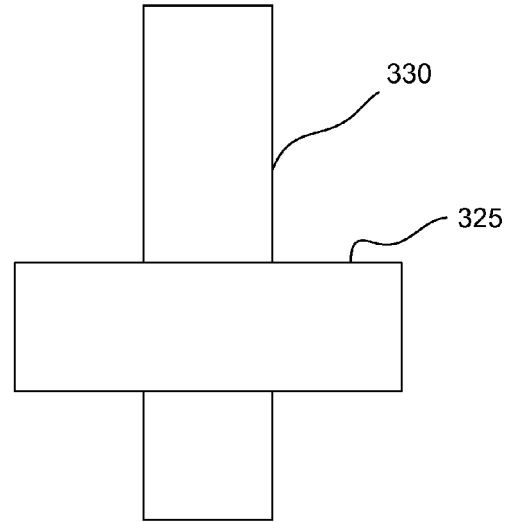
FIG. 4B     FIG. 4C

STYLUS TILT TRACKING WITH A DIGITIZER

RELATED APPLICATION

This application claims the benefit of priority under 35 USC §119(e) of U.S. Provisional Patent Application No. 61/899,933 filed Nov. 5, 2013, the contents of which are incorporated herein by reference in their entirety.

FIELD AND BACKGROUND OF THE INVENTION

The present invention, in some embodiments thereof, relates to a stylus-enabled digitizer system and, more particularly, but not exclusively, to a system and method for tracking orientation of a stylus with respect to a digitizer.

Digitizer systems are used as computer input devices for capturing data or handwritten signatures, text, drawings, symbols or the like. Digitizing tablets and/or touch screens are exemplary digitizer systems used to replace a mouse as a primary pointing and navigation device for desktop computers. A user interacts with the digitizer system by positioning and moving an object such as stylus and/or a finger over a sensing surface of the system, e.g. a tablet and/or a touch screen. Location of the object with respect to the sensing surface is tracked by the digitizer system and interpreted as a user command. An electromagnetic stylus is one type of stylus known in the art for operating a digitizer system. The electromagnetic stylus operates by emitting an electromagnetic signal at or near the writing tip that can be picked up at locations on the sensing surface of the system. Position detection can typically be performed while the object is either touching and/or hovering over the sensing surface.

U.S. Pat. No. 6,690,156 entitled "Physical Object Location Apparatus and Method and a Platform using the same," U.S. Pat. No. 7,292,229 entitled "Transparent Digitizer," and U.S. Pat. No. 7,372,455 entitled "Touch Detection for a Digitizer," all of which are assigned to N-trig Ltd., the contents of all of which are incorporated herein by reference, describe a device for detecting objects disposed in association with a graphical display device. The device includes a transparent sensing arrangement of detectors located on the display screen that provide output to detect a location of the object in relation to the display screen.

In U.S. Pat. No. 7,292,229 there is also described an electromagnetic stylus designed to generate an electric field concentration in the vicinity of the front tip so that a location of the stylus with respect to the display screen can be accurately determined. It is described that the stylus can optionally also generate an electric field concentration in the vicinity of a reverse tip located at a second end remote from the front tip for detecting location during an eraser event. Variations in the electric field generated at each of the tips can be introduced to differentiate between an eraser event and a front tip event.

US Patent Application Publication No. 20130088465 entitled "Object Orientation Detection with a Digitizer," assigned to N-trig Ltd., the contents of which are incorporated herein by reference, describes a stylus including a plurality of spaced apart transmitters, a digitizer sensor that detects transmission from each of the transmitters at a projected location on the digitizer sensor and circuitry associated with the digitizer sensor for determining an orientation of the object based on a geometric relationship between the projected locations.

SUMMARY OF THE INVENTION

According to an aspect of some embodiments of the present invention there is provided a digitizer system that can track orientation, e.g. tilt of a stylus with respect to a digitizer sensing surface. In some exemplary embodiments, orientation of a stylus with respect to the digitizer sensing surface is determined based on a spread of the stylus signal on the digitizer sensing surface. Typically, the spread is a pattern formed by amplitudes of output on different lines of the digitizer sensor. Alternatively or additional, one or more accelerometers and/or gyroscopes are positioned on each of a stylus and a digitizer sensor and outputs from the accelerometers and/or gyroscopes are compared to determine an orientation of the stylus with respect to the digitizer sensor.

According to an aspect of some embodiments of the present invention, there is provided a method for detecting orientation of a stylus with respect to a digitizer sensing surface, the method including: detecting a signal emitted by a stylus at a plurality of coordinates on a digitizer sensing surface; determining coordinate of a writing tip of the stylus; defining at least one feature characterizing an asymmetrical spread of the stylus signal on the digitizer sensing surface with respect to the writing tip coordinate; and characterizing an orientation of the stylus responsive to the characterization of the asymmetrical spread.

Optionally, the at least one feature is a gradient of a decaying function defined to characterize decay of amplitude from the coordinate of a writing tip as a function of distance from the coordinate of the writing tip.

Optionally, the at least one feature is asymmetry in rate of decay from opposite sides of the coordinate of a writing tip.

Optionally, the at least one feature includes a first rate of a decay of amplitude on one side of the writing tip coordinate along one axis of the digitizer sensor compared to a second rate of a decay of amplitude on an opposite side of the writing tip coordinate along the one axis of the digitizer sensor.

Optionally, the at least one feature includes a third rate of a decay of amplitude on one side of the writing tip coordinate along a second axis of the digitizer sensor compared to a third rate of a decay of amplitude on an opposite side of the writing tip coordinate along that second axis of the digitizer sensor.

Optionally, the method includes correcting the writing tip coordinate determined, responsive to the orientation of the stylus as characterized.

Optionally, characterizing an orientation of the stylus includes determining tilt angle of the stylus toward the digitizer sensing surface.

Optionally, characterizing an orientation of the stylus includes determining a direction of a tilt of the stylus.

Optionally, the writing tip location is determined from an amplitude pattern obtained from the spread of the stylus signal on the digitizer sensing surface.

Optionally, the writing tip coordinate is defined as coordinate at which amplitude of the detected stylus signal is estimated to have a peak.

Optionally, the method includes defining an envelope over the amplitude pattern obtained from the spread of the stylus signal on the digitizer sensing surface; and defining the writing tip coordinate at a location of a peak of the envelope.

Optionally, the method includes defining a pair of decay functions that characterize decays of amplitude on either side of an estimated area of a peak and defining the writing tip coordinate at a location at which the pair of decay functions intersect.

Optionally, the orientation of the stylus is reported to a host associated with the digitizer sensor.

According to an aspect of some embodiments of the present invention, there is provided a method for detecting orientation of a stylus with respect to a digitizer sensing surface, the method comprising: tracking orientation of a digitizer sensing surface in three dimensions; tracking orientation of a stylus interacting with the digitizer sensing surface in three dimensions, wherein the orientation of the digitizer sensing surface is tracked concurrently with tracking of the orientation of the stylus; and comparing the orientation of the digitizer sensing surface with the orientation of the stylus; and detecting an orientation of the stylus with respect to the digitizer sensing surface responsive to the comparing.

Optionally, the orientation of digitizer sensing surface is tracked with an accelerometer is rigidly connected to the digitizer sensing surface.

Optionally, the orientation of stylus is tracked with an accelerometer is positioned on the stylus.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3 is a simplified schematic drawing depicting exemplary parameters of a conductive tip that may affect tilt measurement of a stylus in accordance with some embodiments of the present invention;

FIGS. 4A, 4B and 4C are simplified schematic drawings of exemplary geometries for a conductive portion of a stylus tip in accordance with some embodiments of the present invention;

DESCRIPTION OF SPECIFIC EMBODIMENTS OF THE INVENTION

Figure 1:
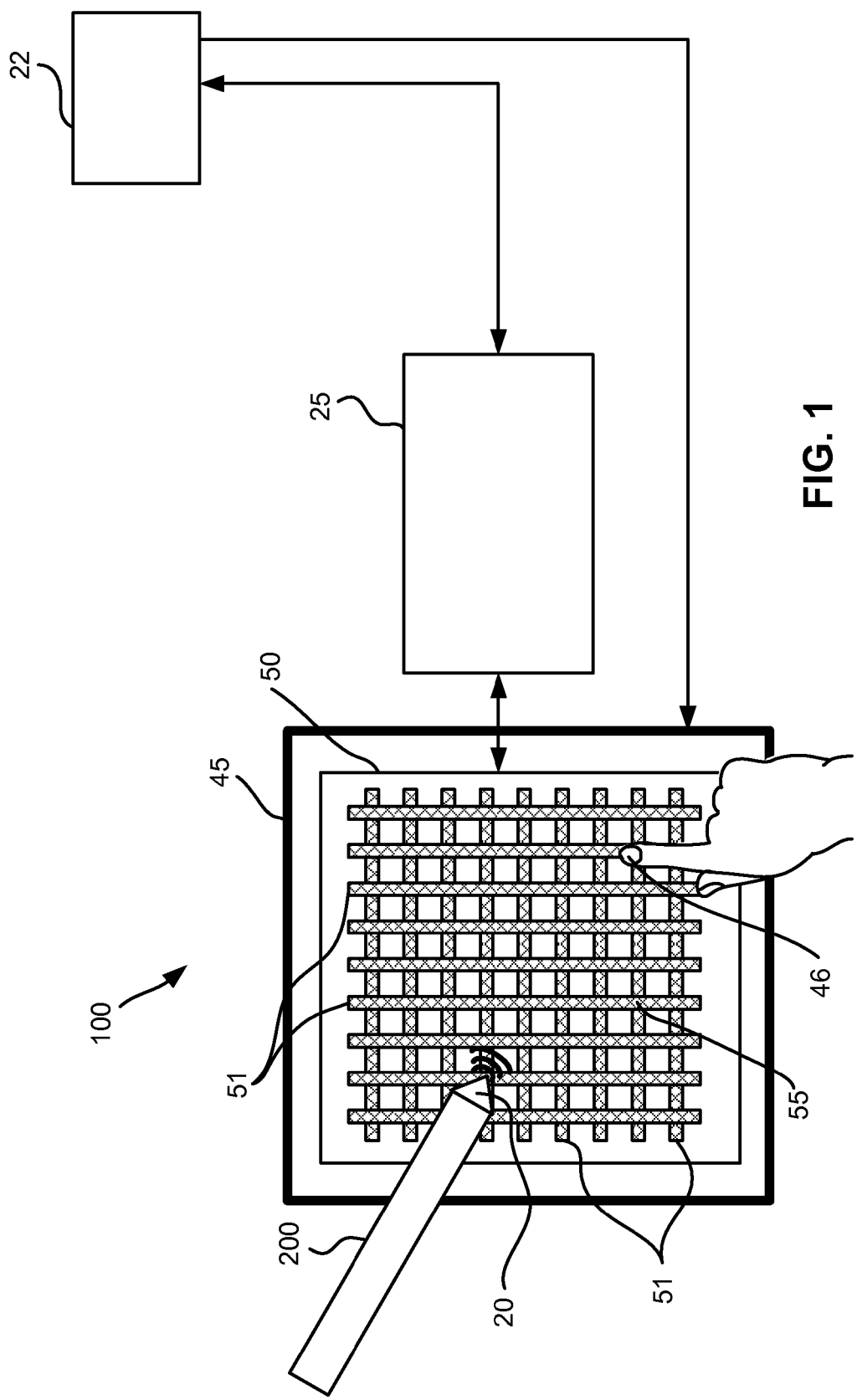
FIG. 1 is a simplified block diagram of an exemplary stylus-enabled digitizer system integrated with a computing device as is known in the prior art.

The present invention, in some embodiments thereof, relates to a stylus-enabled digitizer system and, more particularly, but not exclusively, to a system and method for tracking orientation of a stylus with respect to a digitizer.

Typically, a stylus for interacting with a digitizer sensor includes a conductive portion at or near the writing tip of the stylus through which a stylus signal is transmitted so that location of the writing tip can be tracked by the digitizer sensor. Typically, the writing tip is the portion of the stylus that is closest to the sensing surface during its interaction with the digitizer sensor. Typically, location of the writing tip corresponds to coordinates on a digitizer sensor at or near where the highest amplitude signal from the stylus is received. Typically, the same stylus signal is also received at a plurality of coordinates of the digitizer sensor surrounding the writing tip location but with steadily decreasing amplitude.

In some known styluses, the conductive portion extends over a length along the stylus axis. The present inventor has found that while the stylus is perpendicular to the sensing surface, the location of the writing tip is detected at a center of a spread of the stylus signal and while the stylus is tilted toward the digitizer sensing surface, distribution of the signal transmitted by the stylus is mostly spread or concentrated over an area of the sensor under the tilt, e.g. an area covering a projection of an extension of the conductive tip along the stylus axis. As such, while the stylus is tilting, the area on the sensing surface over which the signal is received is not spread symmetrically with respect to a determined location of a writing tip of the stylus. The present inventors have found that parameters of the spread of the detected signal and/or a relationship between the detected location of the writing tip and a parameter of the spread can be used to track tilt of the stylus. Optionally, parameters of the spread of the detected signal include gradients and/or decay of amplitudes detected across the horizontal and vertical axes of the digitizer sensor. In some exemplary embodiments, a pair of decay functions is defined along each axis to represent decay from either side of peak amplitude. Typically, amplitude is estimated to decay with distance from a conductive object center at a rate that is similar to a decay in capacitive coupling, e.g. at a rate of one over a distance from the writing tip. Typically, the rate of decay is a function of both tilt of the stylus and geometry of the writing tip. Optionally, parameters of the pair of decay functions and/or parameters characterizing a rate of decay from either side of peak amplitude are compared. In some exemplary embodiments, a coordinate of the writing tip on each axis is defined at a point where the pair of decay functions intersects. Optionally, parameters of the spread of the detected signal on each of the horizontal and vertical axis include number of conductive lines on either side of the writing tip location that pick up a stylus signal. Optionally, a ratio of the number of lines on each side of the writing tip location is determined for each axis and the two ratios are used to determine both an angle of tilt and a direction of the tilt.

The present inventor has found that the spread is due to the increased proximity between the elongated portion of the conductive tip and the sensing surface as the stylus tilts toward the sensing surface. Optionally, as the elongated conductive portion tilts toward the sensing surface, an area over which the stylus is capacitively coupled with the digitizer sensor increases. According to some embodiments of the present invention, a conductive portion of the stylus tip is designed to enhance changes in parameters of the spread of the detected signal responsive to tilt of the stylus. In some exemplary embodiments, the conductive portion of the stylus tip is defined to be cone shaped and/or to taper toward the writing tip. Optionally, the stylus tip is shaped as a rod with a surrounding ring positioned at a defined distance from one end of the rod.

According to some embodiments of the present invention, one or more orientation sensors, e.g. accelerometers and/or gyroscopes and attached to both the stylus and the digitizer sensing surface for sensing a relative orientation between the stylus and the digitizer system. Optionally, at least two orientation sensors are included in the stylus so that turning of the stylus about its longitudinal axis can be distinguished from tilt with respect to the digitizer sensing surface. For example, each of the stylus and the digitizer comprises an accelerometer. A difference between readings of the two accelerometers provides for orientation of the stylus relatively to the digitizer. In some exemplary embodiments, orientation of a stylus is determined based on output from one or more orientation sensors and also based on a spread pattern of the stylus signal on the digitizer sensing surface.

According to some embodiments of the present invention, orientation of the stylus with respect to the digitizer sensor is periodically transmitted to the host computer along with coordinates of the tip location. In some exemplary embodiments, tilt information is used by one or more processing routines performed by the digitizer system. Optionally, tilt information is used by the digitizer system for palm rejection, differentiating between right handed and left handed users, and/or for manipulating objects on a screen. Optionally, tilt information is used by an application executed by the digitizer system. Optionally, a drawing application may draw a wider line when the stylus is tilted, similarly to drawing with a tilted traditional pencil. In some exemplary embodiments, detected orientation of the stylus is used to manipulate objects displayed on an associated display screen in three dimensions.

For purposes of better understanding some embodiments of the present invention, as illustrated in FIGS. 2-7 of the drawings, reference is first made to the construction and operation of a stylus enabled digitizer system as illustrated in FIG. 1. According to some embodiments of the present invention, a computing device 100 includes a display screen 45 that is integrated with a digitizer sensor 50. In some exemplary embodiments, digitizer sensor 50 is a grid based capacitive sensor formed with conductive strips 51 that are operative to detect input by stylus 200 transmitting an electromagnetic signal and/or touch of one or more fingertips 46 or other conductive objects. In some exemplary embodiments, the input provided by stylus 200 is one or more signal bursts and/or pulses that are transmitted by the stylus at a defined repetition rate. In some exemplary embodiments, digitizer circuitry 25 manages a synchronization signal for synchronizing signal bursts emitted by stylus 200 with sampling windows for sampling output from sensor 50. Optionally, one or more signal bursts and/or pulses that are transmitted by stylus 200 include information regarding operation of stylus 200 and/or pressure applied on a tip 20 of stylus 200. Typically, the signal bursts transmitted by stylus 200 is picked up by one or more conductive trips 51 on both the horizontal and vertical axis of the grid. In some exemplary embodiments, the information is decoded by digitizer circuitry 25. Typically, location of the stylus tip 20 as well as additional information as provided by stylus 200 is reported to host 22 associated with the digitizer sensor 50.

Optionally, a mutual capacitance detection method and/or a self-capacitance detection method are applied on sensor 50 for sensing interaction with fingertip 46. Typically, during mutual capacitance and self-capacitance detection, digitizer circuitry 25 is required to send a triggering pulse and/or interrogation signal to one or more conductive strips 51 of digitizer sensor 50 and to sample output from conductive strips 51 in response to the triggering and/or interrogation. In some embodiments, some or all of conductive strips 51 along one axis of the grid based sensor are interrogated simultaneously or in a consecutive manner, and in response to each interrogation, outputs from conductive strips 51 on the other axis are sampled. This scanning procedure provides for obtaining output associated with each junction 55 of the grid based sensor 50. Typically, this procedure provides for detecting one or more conductive objects, e.g. fingertip 46 touching and/or hovering over sensor 50 at the same time (multi-touch). Optionally, digitizer circuitry 25 alternates between scanning digitizer sensor 50 for detection of one more fingertips 46 and sampling outputs on both the horizontal and vertical conductive strips 51 for location a signal transmitted by stylus 200.

Typically, output from digitizer circuitry 25 is reported to host 22. Typically, the output provided by digitizer circuitry 25 includes coordinates of a stylus 200, e.g. coordinates of writing tip 20 and/or coordinates of one or more fingertips 46 interacting with digitizer sensor 50. Optionally, digitizer circuitry 25 additionally reports a hover or touch state for stylus 200 and/or fingertip(s) 46. Optionally, digitizer circuitry 25 additionally identifies coordinates as originating from stylus 200 or fingertip 46. Optionally, digitizer circuitry 25 additionally reports pressure applied on a tip of stylus 200. Typically, digitizer circuitry 25 uses both analog and digital processing to process signals and/or data picked up from sensor 50. Optionally, some and/or all of the functionalities of digitizer circuitry 25 are integrated and/or included in host 22.

Digitizer systems that are similar to digitizer sensor 50 with digitizer circuitry 25 are described with further details, for example in U.S. Pat. No. 6,690,156 entitled "Physical object location apparatus and method and a graphical display device using the same," U.S. Pat. No. 7,292,229 entitled "Transparent Digitiser," the contents of the three patents are incorporated herein by reference and/or in U.S. Pat. No. 7,372,455 also incorporated herein by reference.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Figure 2A:
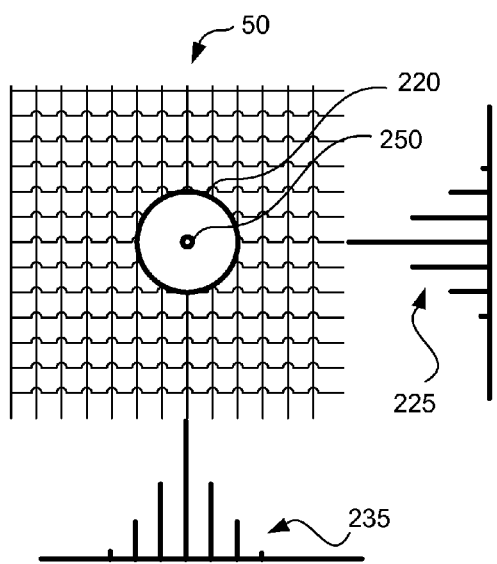
FIGS. 2A, 2B, 2C, 2D, 2E and 2F are simplified schematic drawings showing exemplary spreads of a stylus signal as detected on a digitizer sensor for different tilt angles of a stylus and for different tilt directions in accordance with some embodiments of the present invention.

Reference is now made to FIGS. 2A, 2B, 2C, 2D, 2E and 2F showing simplified schematic drawings of exemplary spreads of a stylus signal as detected on a digitizer sensor for different tilt angles of a stylus and for different tilt directions in accordance with some embodiments of the present invention. According to some embodiments of the present invention, when a stylus is held perpendicular with respect to digitizer sensor 50, a writing tip location 250 is at a center of a spread 220 of the stylus signal (FIG. 2A). Spread 220 represents an estimated area on digitizer sensor 50 over which a stylus signal above a predefined threshold is picked up. Typically, spread 220 is defined based on an array of amplitudes 225 detected from vertical conductive strips 51 and an array of amplitudes 235 detected from horizontal strips 51 of digitizer sensor 50. Typically, the symmetry detected when the stylus and/or the conductive portion of the stylus tip is positioned perpendicular with respect to digitizer sensor 50 can also be seen directly from exemplary amplitudes 225 and 235. Typically, a point corresponding to the highest amplitude output in the horizontal and vertical axis correspond to location of the writing tip of the stylus on the sensing surface. Typically, the amplitude is highest at the writing tip since the writing tip is the portion that is closest to the digitizer sensing surface. Typically, the point corresponding to the highest amplitude output and/or a peak of the array of amplitudes 225 and/or 235 falls between sampled points and is determined by estimation. Typically, it is assumed that a writing tip can be positioned between conductive strips so that the sampled point is not necessarily the peak amplitude. Optionally, an envelope of outputs is defined, and the highest amplitude output is defined as a peak in the defined envelope. Optionally, an envelope may be defined for each axis or may be defined in two dimensions based on the array of amplitudes detected on both the horizontal and vertical axis. It is noted that spread 220 is shown here as a circular area for simplicity purposes. Alternatively, spread 220 may be represented as a square or other shaped area. Alternatively, a two dimensional spread 220 is not determined and symmetry is determined directly from patterns 225 and 235.

Figure 2B:
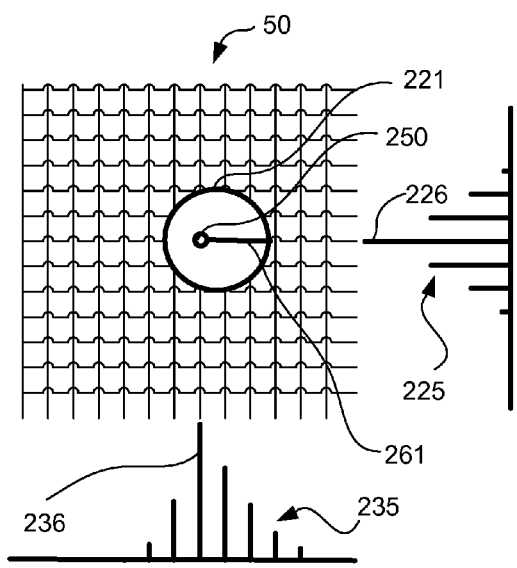
Figure 2C:
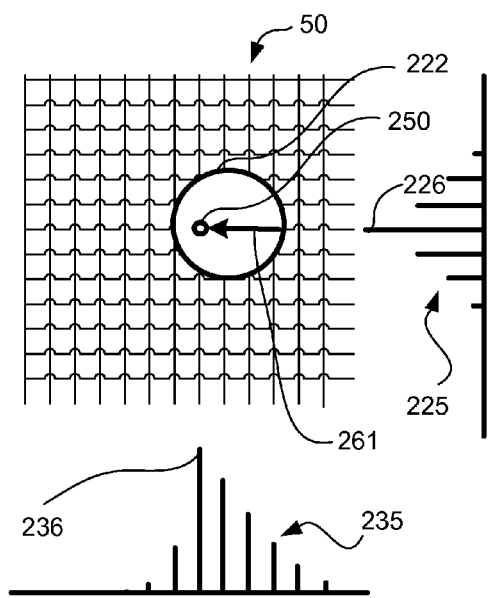

According to some embodiments of the present invention, with the spread is symmetric, it is determined that the stylus is perpendicular to the sensing surface. Typically, when the stylus is tilted, a spread of the stylus signal becomes asymmetric with respect to the writing tip location 250 and is skewed toward the side of the tilt. In some exemplary embodiments, when a stylus is tilted to the right in a direction represented by 261, a spread of the stylus signal is concentrated on the right side, e.g. spread 221 (FIG. 2B) and spread 222 (FIG. 2C). The skewed spread of the signal when the stylus is tilted to the right can be detected and evaluated for example from pattern 235 showing higher amplitude signals spread over more conductive strips on the right side of the maximum amplitude output 236 as compared to the left side of the maximum amplitude output 236. As the tilt angle increases the spread is more skewed toward the tilt direction, e.g. spread 222 is representative of a larger tilt angle as compared to spread 221 and is more skewed toward the tilt direction as compared to spread 221. Optionally, a number of conductive lines detecting the stylus signal on both sides of the maximum amplitude output 236, e.g. writing tip location is determined and the tilt is estimated based on these numbers and/or a ratio between these numbers. In some exemplary embodiments, slope and/or a gradient of the amplitudes on either side of maximum amplitude output 236, e.g. the writing tip location is determined and used to estimate the tilt angle of the stylus. The exemplary tilts shown in FIGS. 2B and 2C are aligned with the horizontal direction. Typically, in such a case a rate of decay of amplitudes 225 on either side of maximum amplitude output 226 is symmetrical and the rate of decay of amplitudes 235 on either side of maximum amplitude output 226 is asymmetric. It is noted that FIGS. 2B and 2C depict maximum amplitude output 226 to be sampled points for simplicity purposes. Typically, it is assumed that the peak amplitude may appear between sampled points.

Figure 2D:
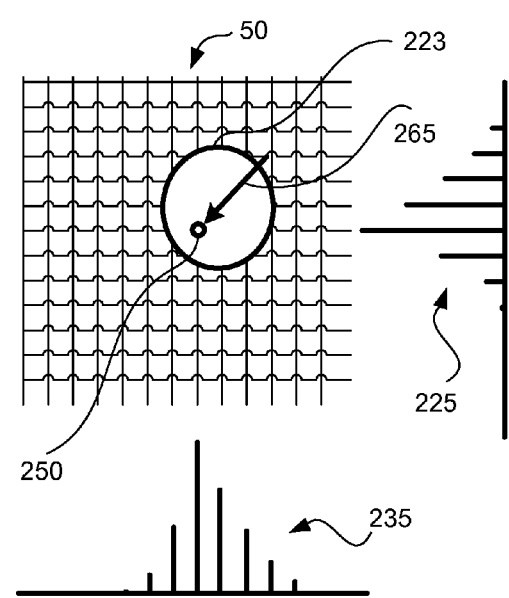

In another example shown in FIG. 2D, the stylus tip is tilted in a direction 265 toward the upper right side and spread 223 is concentrated on the upper right side with respect to writing tip location 250. In this example, the skew of the pattern is detected on both the horizontal and vertical axis. According to some embodiments of the present invention, patterns 225 and 235 are evaluated to estimate both the direction of the tilt and its angle. Optionally, gradients of the amplitude decay across each of patterns 225 and 235 are determined and used to detect both a direction and an extent of tilt. Optionally, a ratio of the number of lines on each side of the writing tip location is determined for each axis and the two ratios are used to determine both an angle of tilt and a direction of the tilt. Optionally, the ratios or other parameters are compared to a look up table to determine both direction and tilt.

Figure 2E:
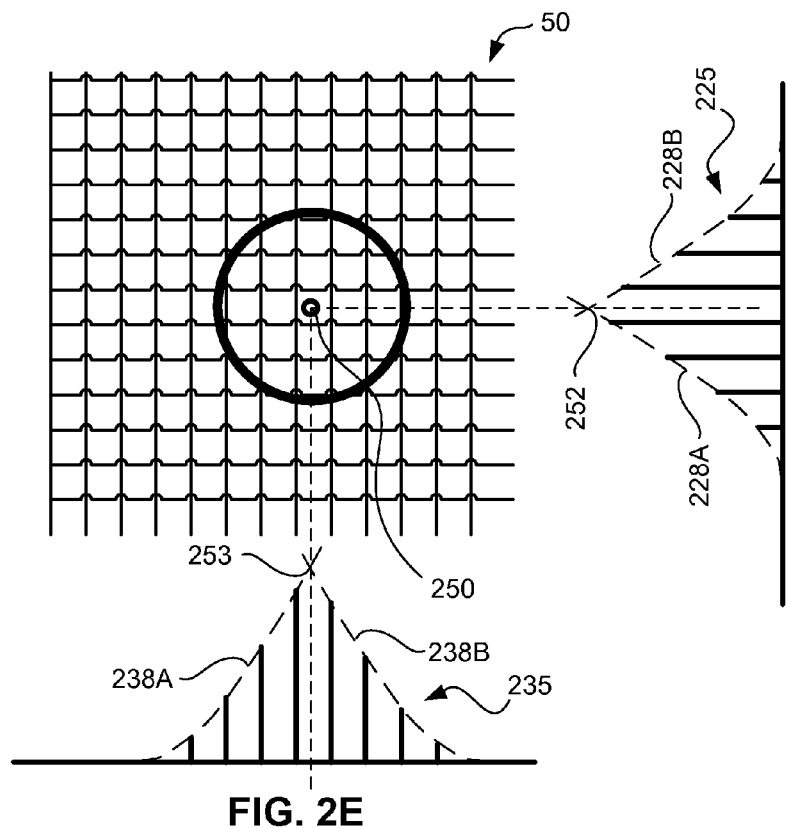

In another example shown in FIG. 2E, a writing tip 250 is between conductive strips of sensor 50 as may typically occur during stylus interaction with digitizer sensor 50. In such a case, the location of the writing tip may be determined based on the pattern of amplitudes, e.g. pattern 225 and pattern 235. According to some embodiments of the present invention, an envelope for each pattern of amplitudes, e.g. pattern 225 and pattern 235 is defined and a location of a peak in an envelope is used to define a coordinate of the writing tip. According to some embodiments of the present invention, decay functions are defined to characterize decay of the amplitude across the digitizer sensor. For example, decay functions 238A and 238B may be defined for the horizontal axis based on pattern 235 and decay functions 228A and 228B may be defined for the horizontal axis based on pattern 225. In some exemplary embodiments, a coordinate for the writing tip in the horizontal axis is defined as a point of intersection 253 between decay functions 238A and 238B and a coordinate for the writing tip in the vertical axis is defined as a point of intersection 252 between decay functions 228A and 228B.

In some exemplary embodiments, functions 228A, 228B, 238A and 238B are expected to be governed by a relationship at least close to $y=1/x$, where y represents the amplitude in pattern 225 or pattern 235 and x represents distance from a location of maximum amplitude in pattern 225 or pattern 235 similar to a relationship governing capacitive coupling between conductive plates. In some exemplary embodiments, when the stylus is perpendicular to digitizer sensor 50 as shown in FIG. 2E, decay function 228A will be a minor image of decay function 22B. Likewise, decay function 238A will be a mirror image of decay function 23B.

Figure 2F:
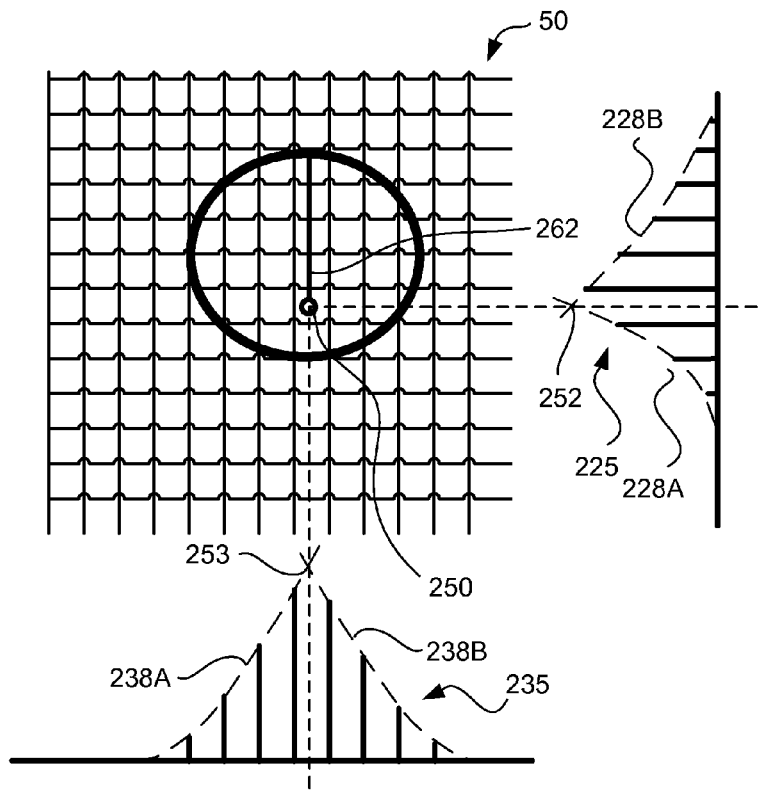

Referring now to FIG. 2F, according to some embodiments of the present invention, tilt is identified when decay function 228A is different and/or has a different rate of decay, as compared to decay function 22B and/or when decay function 238A is different and/or has a different rate of decay, as compared to decay function 23B. In some exemplary embodiments tilt angle in a horizontal direction 262 is determined by comparing parameters of decay functions 238A and 238B and tilt angle in the vertical direction is determined by comparing parameters of decay functions 228A and 228B. Information from the horizontal and vertical direction can be combined to determine tilt angle and tilt direction.

Reference is now made to FIG. 3 showing a simplified schematic drawing depicting exemplary parameters of a conductive tip that may affect tilt measurement of a stylus in accordance with some embodiments of the present invention. According to some embodiments of the present invention, a conductive portion 360 of a writing tip is designed to increase sensitivity of the pattern of amplitudes 225 and 235 to tilt. According to some embodiments of the present invention, a height H of conductive portion 360 along the longitudinal axis 450 of the stylus is defined. Optionally, increasing height 'H' provides increasing a range of conductive strips 51 that can pick up the stylus signal as the stylus tilts and can thereby improve a resolution for detecting the tilt angle. In some exemplary embodiments, conductive portion 360 is cone shaped and a cone angle 'a' is defined. Optionally, larger cone angle 'a' provides for larger spreads, more strips being affected and thus more exact determination of the tilt angle. However, larger cone angle 'a' also limits the range of motion of the stylus tip.

Reference is now made to FIGS. 4A, 4B and 4C showing simplified schematic drawings of exemplary geometries for a conductive portion of a stylus tip in accordance with some embodiments of the present invention. In some exemplary embodiments, a conductive portion of a stylus tip is tapered toward the writing tip of the stylus. As the conductive portion tilts with the stylus, additional portions of the conductive tip approach the digitizer sensor and the capacitive coupling with the digitizer sensor increases and spreads over a larger area. Optionally, a conductive portion of the stylus tip is cone shaped as shown in FIG. 4A. Optionally, a conductive portion of the stylus tip has a curved edge as shown in FIG. 4B, e.g. is shaped as a hemisphere or a paraboloid. In some exemplary embodiments, a conductive portion of the stylus tip is formed from a rod shaped structure 330 including a surrounding ring 325. Optionally, as the stylus tilts, a portion of ring 325 approaches the digitizer sensor and capacitive coupling with the digitizer sensor increases on the side of the tilt. Typically, the conductive portion of the stylus tip is embedded and/or coated with non-conductive material to improve the feel of the tip and also to avoid scratching the sensing surface. Optionally, a shape of the non-conductive material may be other than that of the conductive portion. Typically, the non-conductive material is tapered to form a relative sharp or small writing tip 20. In some exemplary embodiments, conductive plastic is used in place of a conductive portion that is coated with non-conductive material.

Figure 5:
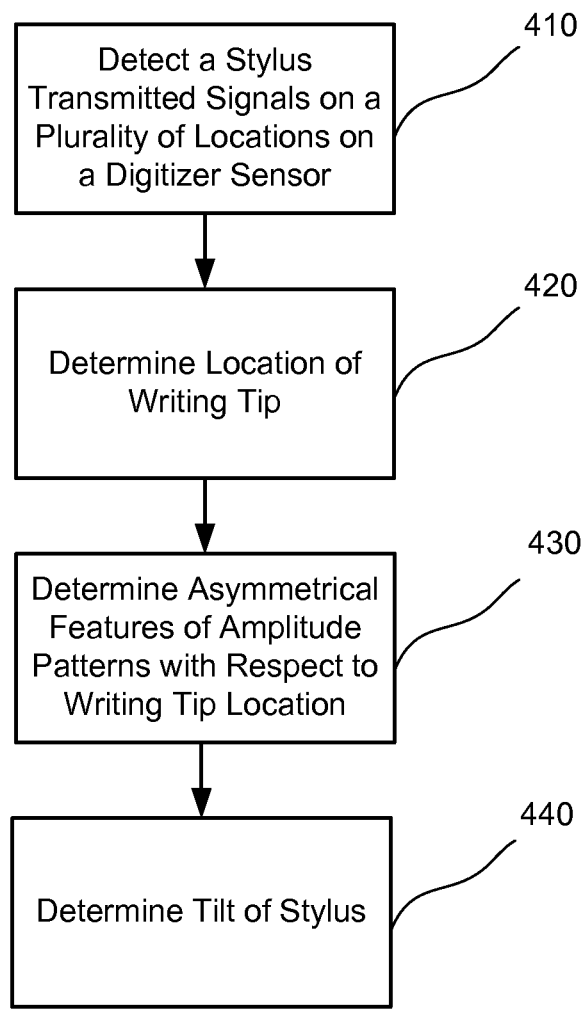
FIG. 5 is a simplified flow chart of an exemplary method for detecting stylus tilt based on a pattern of signal outputs spread over a digitizer sensor in accordance with some embodiments of the present invention.

Reference is now made to FIG. 5 showing a simplified flow chart of an exemplary method for detecting stylus tilt, based on a pattern of signal outputs spread over a digitizer sensor in accordance with some embodiments of the present invention. According to some embodiments of the present invention, a stylus signal transmitted over the vicinity of the stylus is detected at a plurality of locations on a digitizer sensor (block 410). Typically, amplitude of the stylus signal detected varies with location on the digitizer sensor. According to some embodiments of the present invention, coordinates and/or locations of the writing tip are determined (block 420). Typically, coordinates of the writing tip correspond to coordinates the highest amplitude signal in both the horizontal and vertical axis. Optionally, interpolation and/or enveloping is used to enhance resolution for detecting location of the writing tip, e.g. as when the writing tip is located a point between gridlines.

According to some embodiments of the present invention, a pattern of amplitudes detected across each of the horizontal and vertical axes of the digitizer sensor is evaluated and asymmetrical features of the pattern with respect to coordinates of the writing tip location are determined (block 430). In some exemplary embodiments, rate of decay of the stylus signal on each side of the writing tip location as a function of distance is determined for each axis and used as a feature characterizing the asymmetry. Optionally, a ratio formed from the number of conductive lines detecting the stylus signal on the two sides of the writing tip location is used as a feature characterizing the asymmetry. Alternatively, tilt is determined prior to identifying the writing tip location. In some exemplary embodiments, location of the writing tip and stylus tilt is determined during an iterative process, for example where location of the writing tip is estimated and then later corrected according to the defined tilt. Optionally, tilt can be estimated and then corrected according to the defined location of the writing tip.

In some exemplary embodiments, rates of decay from each side of a location of the writing tip or from peak amplitude are evaluated for each axis to determine direction and angle of the tilt. Typically, the direction of the tilt corresponds to a direction over which the decay of the stylus signal is most shallow. In some exemplary embodiments, the tilt angle is related to a rate of the decay at the direction at which the decay is slowest. Typically, the tilt angle relatively to a line perpendicular to the digitizer is greater when the rate of the decay is slower and/or when the stylus signal is detected over more conductive lines. Optionally, a contour of the spread of the detected signals in two dimensions is determined to identify one or more asymmetrical features. According to some embodiments of the present invention, angle and/or direction of tilt are determined based on determining one or more features of the spread (block 440). In some exemplary embodiments, values for features determined are compared to a look-up table to identify a relationship between the features and the stylus tilt (direction and/or angle of tilt). Optionally, the look up table is stored in memory allocated in digitizer circuitry 25. Optionally, a formula such as but not limited to a polynomial function defining the relationship between one or more features and tilt is defined and stored in the memory of digitizer circuitry 25 for detecting the tilt, and applied when the stylus is used. Optionally, a relationship between one or more features, tilt and writing tip location is defined using empirical data. For example, a robot or a jig may be used to controllably change tilt of the stylus with high accuracy while detecting output from the digitizer sensor.

Figure 6:
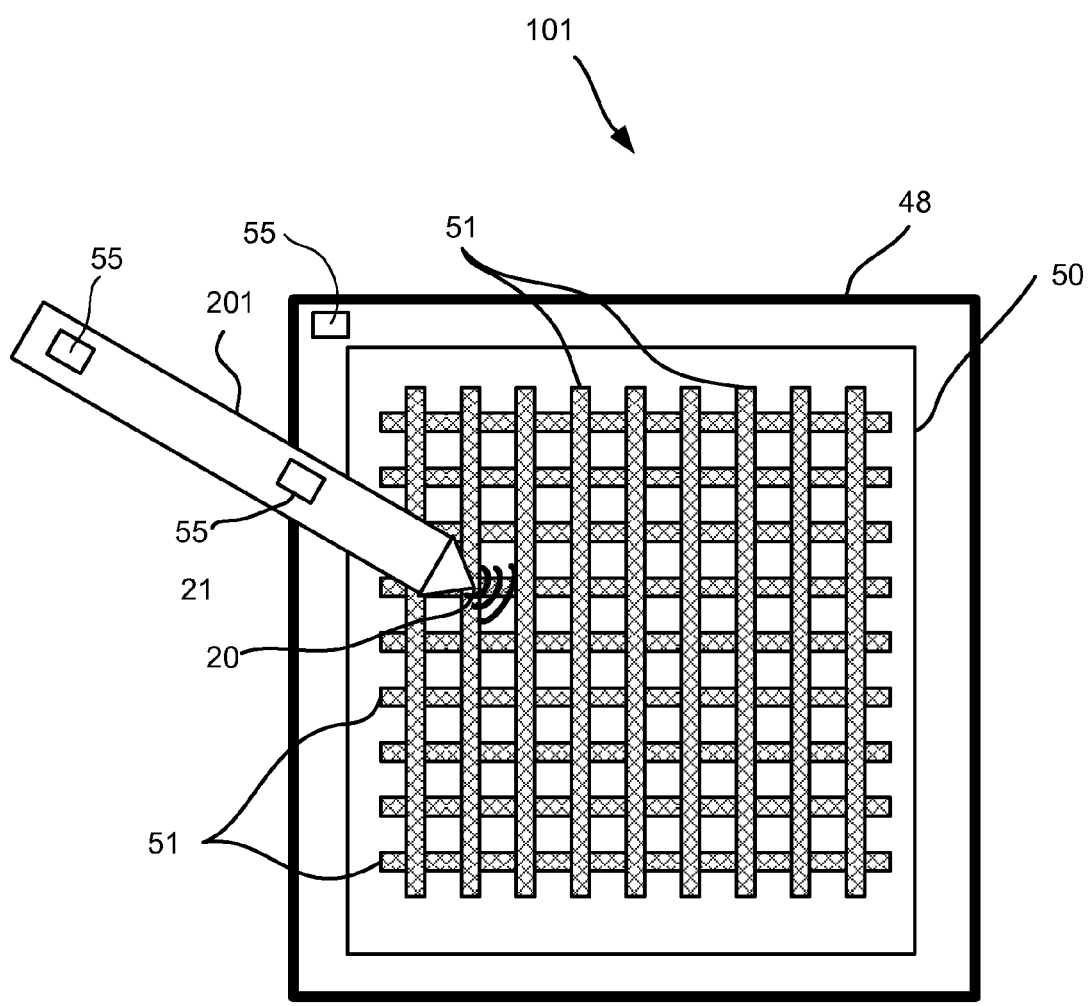
FIG. 6 is a simplified block diagram of an exemplary stylus enabled digitizer system that includes orientation sensors on both a digitizer sensing surface and an associated stylus in accordance with some embodiments of the present invention.
Figure 7:
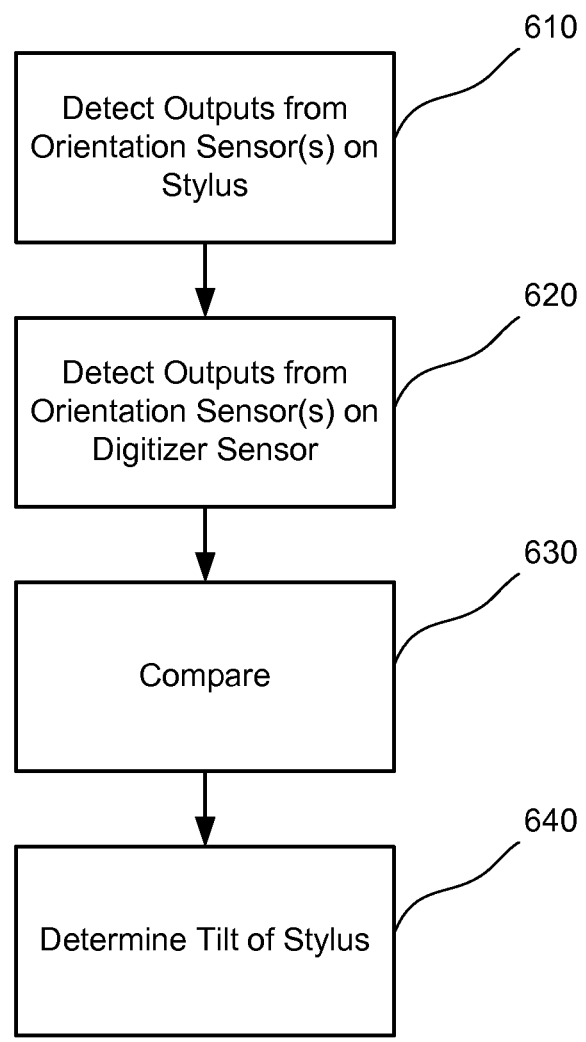
FIG. 7 is a simplified flow chart of an exemplary method for detecting stylus tilt from outputs provided by orientation sensors positioned on both a digitizer sensing surface and an associated stylus in accordance with some embodiments of the present invention.

Reference is now made to FIG. 6 showing a simplified block diagram of an exemplary stylus enabled digitizer system that includes orientation sensors on both a digitizer sensing surface and an associated stylus, and to FIG. 7 showing a simplified flow chart of an exemplary method for detecting stylus tilt from outputs provided by orientation sensors positioned on both a digitizer sensing surface and an associated stylus, both in accordance with some embodiments of the present invention. According to some embodiments of the present invention, a stylus 201 includes one or more accelerometers 55 and/or gyroscopes. According to some embodiments of the present invention, outputs from one or more accelerometers 55 and/or gyroscopes in stylus 201 are detected for tracking changes in an orientation of stylus 201 (block 610). Typically, orientation is determined in three dimensions (x, y, and z) and with respect to gravity, e.g. using a global coordinate system. According to some exemplary embodiments, a same or similar accelerometer 55 and/or gyroscope is mounted on digitizer sensor 50 and/or a sensing surface 48 or frame associated with digitizer sensor 50. According to some embodiments of the present invention, outputs from accelerometers 55 and/or gyroscopes on digitizer sensor 50 are detected for tracking concurrent changes in an orientation of digitizer sensor 50 (block 620). According to some embodiments of the present invention, a direction and angle of tilt is determined by comparing output from subtracting outputs from accelerometer 55 in the stylus with outputs from accelerometer 55 on the digitizer sensor 50 (block 630). In some exemplary embodiments, output from each dimension of accelerometer 55 on the stylus is subtracted with output from corresponding dimension of accelerometer 55 on the digitizer sensor. According to some embodiments of the present invention, the tilt of the stylus is determined from the subtracted value (block 640). Typically, output from the orientation sensors on both the stylus and the digitizer are forwarded to a processing unit, e.g. in digitizer circuitry 25 to determine tilt angle and tilt direction. Optionally, the processing unit also adjusts writing tip location based on the determined tilt angle and/or direction.

The terms "comprises", "comprising", "includes", "including", "having" and their conjugates mean "including but not limited to".

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A method comprising:
   detecting a signal emitted by a stylus at a plurality of coordinates on a digitizer sensing surface;
   determining coordinates of a writing tip of the stylus;
   defining at least one feature characterizing an asymmetrical spread of the stylus signal on the digitizer sensing surface with respect to the writing tip coordinates;
   defining asymmetry in a peak formed by amplitudes of the signal detected at the plurality of coordinates; and
   detecting an orientation of the stylus with respect to a digitizer sensing surface based on the characterization of the asymmetry in the peak.

2. The method according to claim 1, wherein the at least one feature is a gradient of a decaying function defined to characterize decay of amplitude from the coordinates of a writing tip as a function of distance from the coordinates of the writing tip.

3. The method according to claim 1, wherein the at least one feature is asymmetry in rate of decay from opposite sides of the coordinates of a writing tip.

4. The method according to claim 1, wherein the at least one feature includes a first rate of a decay of amplitude on one side of the writing tip coordinates along one axis of the digitizer sensor compared to a second rate of a decay of amplitude on an opposite side of the writing tip coordinates along the one axis of the digitizer sensor.

5. The method according to claim 4, wherein the at least one feature includes a third rate of a decay of amplitude on one side of the writing tip coordinates along a second axis of the digitizer sensor compared to a third rate of a decay of amplitude on an opposite side of the writing tip coordinates along that second axis of the digitizer sensor.

6. The method according claim 1, comprising correcting the writing tip coordinates determined, responsive to the orientation of the stylus as characterized.

7. The method according to claim 1, wherein characterizing an orientation of the stylus includes determining tilt angle of the stylus toward the digitizer sensing surface.

8. The method according to claim 1, wherein characterizing an orientation of the stylus includes determining a direction of a tilt of the stylus.

9. The method according to claim 1, determining the writing tip location is determined from an amplitude pattern obtained from the spread of the stylus signal on the digitizer sensing surface.

10. The method according to claim 9, wherein the writing tip coordinates is defined as coordinates at which amplitude of the detected stylus signal is estimated to have a peak.

11. The method according to claim 9 comprising defining an envelope over the amplitude pattern obtained from the spread of the stylus signal on the digitizer sensing surface; and defining the writing tip coordinates at a location of a peak of the envelope.

12. The method according to claim 9 comprising defining a pair of decay functions that characterize decays of amplitude on either side of an estimated area of a peak and defining the writing tip coordinates at a location at which the pair of decay functions intersect.

13. The method according to claim 1, wherein the orientation of the stylus is reported to a host associated with the digitizer sensor.

14. A method comprising:
    tracking first orientation of a digitizer sensing surface in three dimensions with respect to gravity;
    tracking second orientation of a stylus interacting with the digitizer sensing surface in three dimensions with respect to gravity, wherein the first orientation of the digitizer sensing surface is tracked concurrently with tracking of the second orientation of the stylus;
    comparing the first orientation of the digitizer sensing surface with the second orientation of the stylus; and
    detecting a third orientation of the stylus with respect to the digitizer sensing surface responsive to the comparing.

15. The method according to claim 14, wherein the first orientation is tracked with an accelerometer rigidly connected to the digitizer sensing surface.

16. The method according to claim 14, wherein the second orientation is tracked with an accelerometer positioned on the stylus.

17. The method according to claim 14, wherein the third orientation is tilt angle of the stylus toward the digitizer sensing surface.

18. The method according to claim 14, wherein the third orientation includes direction of a tilt of the stylus with respect to the digitizer sensing surface.

* * * * *